A. GRAHAM.
Vehicle Running-Gear.
No. 198,455. Patented Dec. 25, 1877.
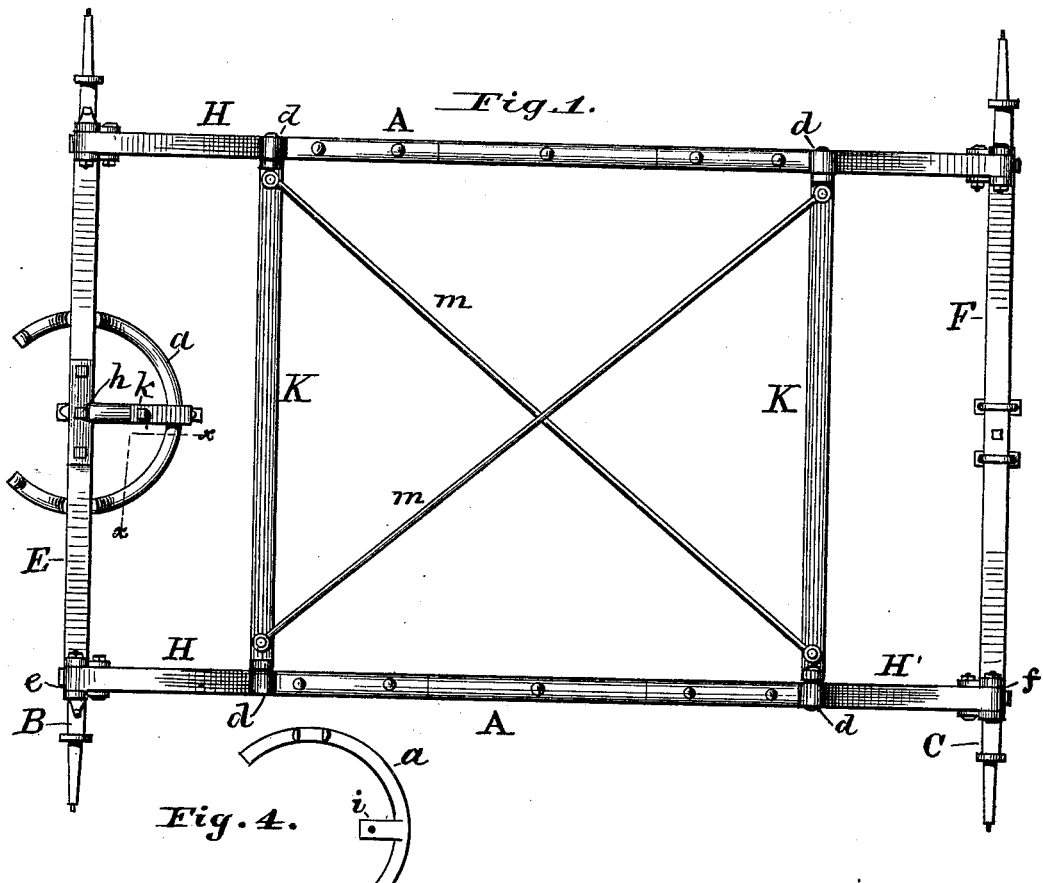
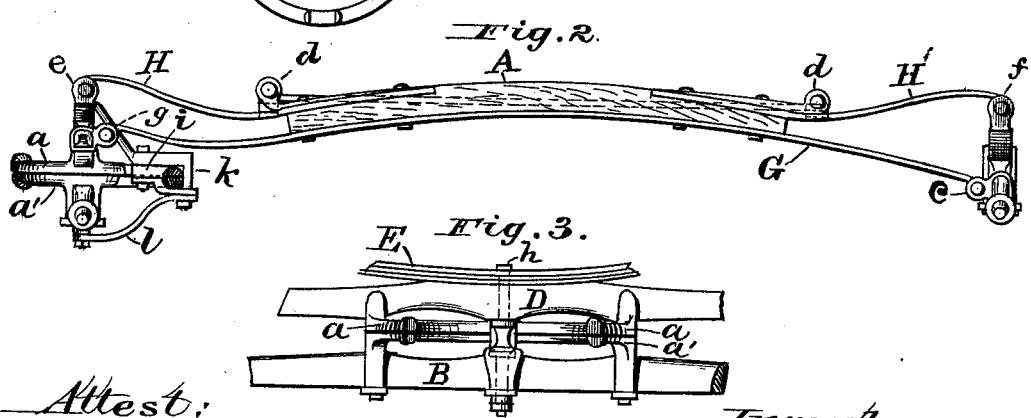
Attest:
H. L. Perrine
H. A. Daniels
Inventor.
Alexander Graham
By Myers & Co.
Attys.

UNITED STATES PATENT OFFICE.

ALEXANDER GRAHAM, OF WHEATLAND, NEW YORK.

IMPROVEMENT IN VEHICLE RUNNING-GEARS.

Specification forming part of Letters Patent No. 198,455, dated December 25, 1877; application filed November 17, 1877.

*To all whom it may concern:*

Be it known that I, ALEXANDER GRAHAM, of the town of Wheatland, in the county of Monroe and State of New York, have invented certain new and useful Improvements in Buggy Gear - Springs and Fifth-Wheels; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to that class of vehicles commonly known as "side-bar buggies;" and consists in certain improvements in the construction of the same, as hereinafter shown and described.

In the accompanying drawings, forming a part of the specification herein, Figure 1 is a plan of my improved buggy - gear. Fig. 2 is a side elevation of the same, a portion being removed, as indicated by the line $x\ x$ in Fig. 1. Fig. 3 is a front view of certain parts. Fig. 4 represents a portion of the fifth-wheel detached.

In the said drawings, A designates the side bars extending along the sides of the buggy. B is the front or forward axle-tree, and C the rear axle-tree. The parts $a$ and $a'$, commonly known as the "fifth-wheel," are located, as shown, between the forward axle-tree and a cross-bar, D, placed above the said axle-tree, and on a line with it. Above the bar D is placed and secured the forward cross-spring E, and the rear cross-spring F is secured to the rear axle-tree C.

Each side bar A is connected with the front and rear parts in the following manner: A spring, G, extends along the side bar, and is firmly secured to the under side thereof, said spring connecting with bar D at the front by means of the coupling $g$, and with the rear axle-tree C by means of the coupling $c$. A spring, H, is firmly secured to the forward end of the side bar, and on the top thereof, said spring connecting with the cross-spring E by means of the coupling $e$. Another spring, H', is in like manner secured to the rear end of the side bar, and connects with the cross-spring F by means of the coupling $f$. Each of the springs H and H' has rigidly attached thereto, at a suitable point, an eye, $d$, these eyes being intended to receive the extremities of the cross-bars K, upon which the body of the buggy rests. The springs G, H, and H' are fastened or secured to the side bar by means of bolts or clips.

The two parts forming the fifth-wheel conform to each other, as usual, the upper part $a$ being secured to the bar D, and the lower part $a'$ being secured to the axle-tree B, the king-bolt $h$ forming the pivotal connection. The part $a$, as seen in Fig. 4, is formed with a projection, $i$, inward from its rim, to which projection is bolted a brace, $k$, which, with the brace $l$, both being secured by bolts, as shown, passes about the parts $a$ and $a'$, supporting them in position, and allowing the lower part $a'$ to move with the axle-tree B during the turning of the vehicle.

The double spring connections formed between the side bars and other parts of the buggy - gear by the springs G, H, and H', coupled as shown, and connecting with cross-bars K, having bracing-rods $m$, serve greatly to lessen the wear and tear of the gearing, and prevent the swaying and wagging of the buggy.

I claim as my invention—

1. The side bars A, provided with springs G, H, and H', connecting with the front and rear parts of the buggy-gear, substantially as set forth.

2. The side bar provided with upper and lower springs at each end, to connect with the front and rear parts of the buggy-gear, the upper spring at each end being coupled to one of the cross-springs of the buggy, as and for the purposes set forth.

3. In the fifth-wheel of a buggy, the part $a$, provided with projection $i$, in combination with the part $a'$ and braces $k$ and $l$, substantially as set forth.

In testimony that I claim the foregoing as my own I affix my signature in presence of two witnesses.

ALEXANDER GRAHAM.

Witnesses:
 JACOB B. HALL,
 JAMES BRIGGS.